United States Patent [19]

Gevers

[11] 4,456,280
[45] Jun. 26, 1984

[54] HYDRAULIC TRAILER STEERING SYSTEM

[75] Inventor: David E. Gevers, Lafayette, Ind.

[73] Assignee: Talbert Manufacturing, Inc., Pleasant Ridge, Ind.

[21] Appl. No.: 337,865

[22] Filed: Jan. 7, 1982

[51] Int. Cl.³ .............................................. B62D 13/04
[52] U.S. Cl. .................................... 280/444; 280/81 B
[58] Field of Search ............... 280/426, 442, 443, 444, 280/81 R, 81 A, 81 B

[56] References Cited

U.S. PATENT DOCUMENTS

| | | | |
|---|---|---|---|
| 2,818,275 | 12/1957 | Hollowell | 280/443 |
| 3,734,538 | 5/1973 | Humes | 280/442 |
| 4,221,398 | 9/1980 | Pautrat | 280/81 B |

FOREIGN PATENT DOCUMENTS 68175  2/1951  Netherlands ........................ 280/443

Primary Examiner—Joseph F. Peters, Jr.
Assistant Examiner—Kenneth R. Rice
Attorney, Agent, or Firm—John R. Nesbitt

[57] ABSTRACT

A trailer includes a frame having a plurality of bell cranks pivoted to the frame. A plurality of suspension units are pivotally connected to the frame to permit independent directional displacement of each suspended unit with respect to the frame. A directing means is provided for directing the trailer in the intended direction, the directing means including at least one, and preferably a pair, of master hydraulic cylinders. A plurality of hydraulic slave cylinders connected to the master cylinders are connected to the master cylinders and to the bell cranks for pivoting the bell cranks with respect to the frame in response to any angular displacement of the directing means, thereby causing the suspension units to pivot such as their axles are directed toward a common center defining the center of the curve through which the trailer is directed.

4 Claims, 4 Drawing Figures

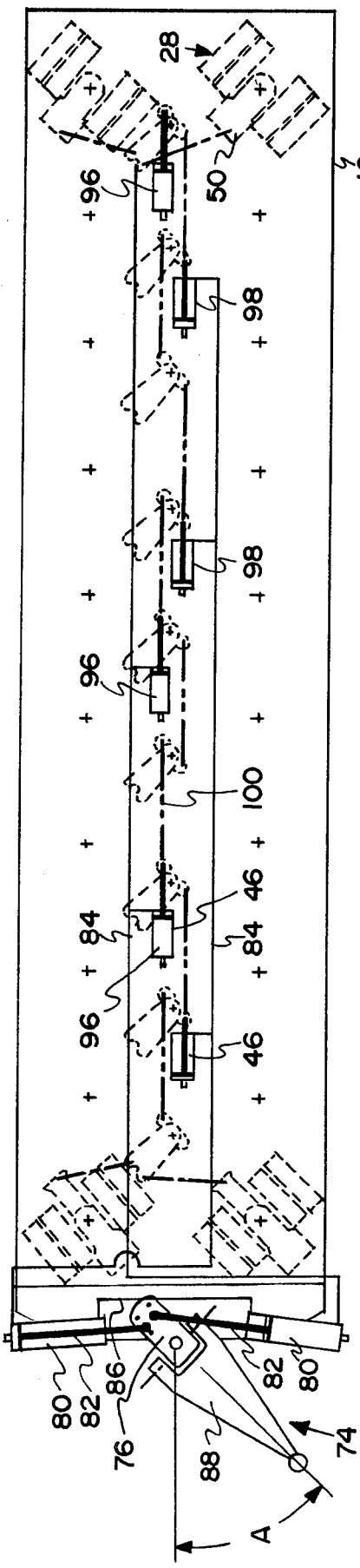
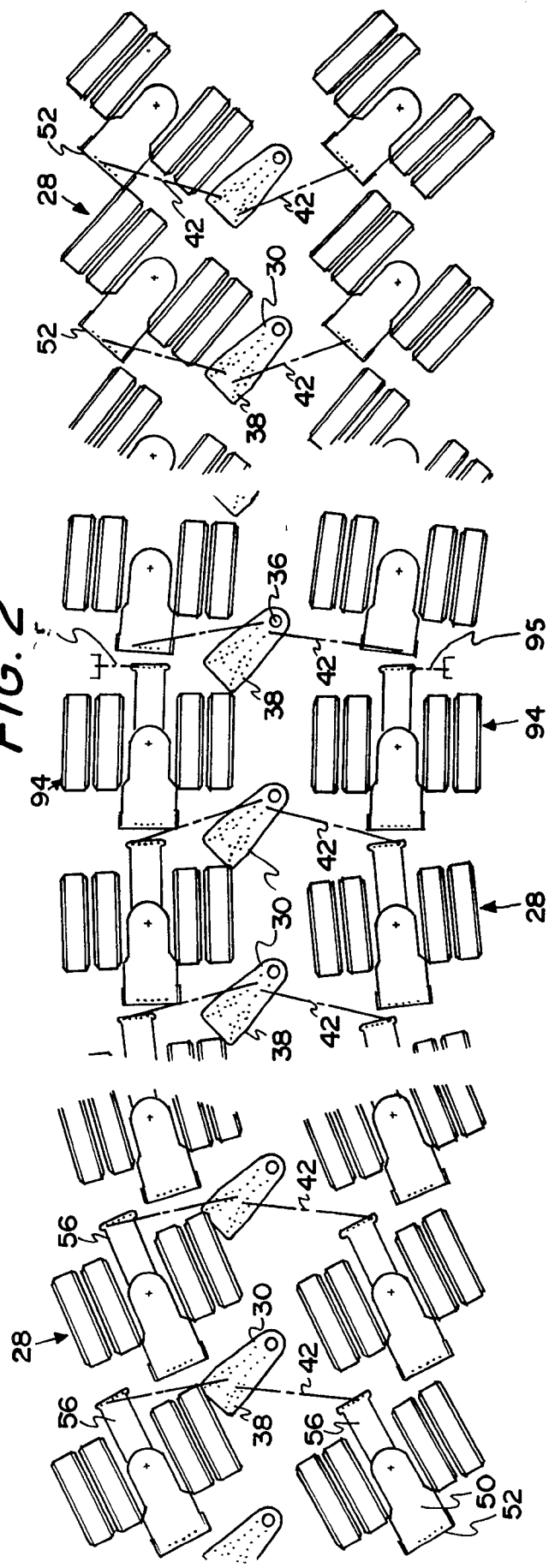
FIG. 2
FIG. 4

HYDRAULIC TRAILER STEERING SYSTEM

The present invention relates generally to land vehicles having multiple independently steerable axles, and in particular to semi-trailers or full trailers having a plurality of individually steered, single axle suspension units, each unit being steered by the pivoting of a draw bar or the like connected to a pulling tractor.

Trailers for carrying extremely heavy and large loads are known in the art which include a frame supported on a plurality of, say, six to forty suspension units, the suspension units being individually pivotally connected to the frame. The suspension units commonly include a single axle having four wheels mounted thereon in tandem pairs on either side of the pivot axis of the suspension unit. A plurality of bell cranks are provided, which are pivotally connected to the frame, each bell crank typically being connected to a laterally adjacent pair of suspension units. Any angular displacement of the bell crank causes a corresponding angular displacement of the suspension unit with respect to the frame. The plurality of bell cranks are mechanically connected together and are also connected to a directing means at an end of the frame for directing the trailer in the intended direction. An angular displacement of the directing means typically causes the bell cranks to be angularly displaced, each bell crank moving through a different angle so that the associated suspension units will also turn through a different arc, thereby aligning the axles of the units with the center of the radius of turn through which the trailer is sought to be directed. The mechanical linkage typically employed requires substantial variation from bell crank to bell crank in order to achieve this difference in angular displacement between bell cranks necessary to arrive at the required turning angle for the various suspension units supporting the trailer. Further, the mechanical coupling between bell cranks is in serial fashion such that, should any tie rod connecting two adjacent bell cranks bend or break, then the angular displacement of all bell cranks is affected, thus requiring immediate correction. Further, since the tie rods connecting the bell cranks are serially arranged and experience various compressional and tensional forces, depending upon their position along the length of the trailer, tie rods of increasing strength are required toward the ends of the trailer, the tie rods on the very ends of the very large trailers being extremely massive and of extremely high-strength specialty steels or the like.

In the present invention, a trailer of the present type includes a frame having a plurality of bell cranks pivotally supported on the frame and a plurality of suspension units pivotally connected to the frame in a manner similar to the prior art. A directing means is included which is connected to an end of the frame for directing the trailer in the intended direction, the directing means being angularly displaceable with respect to the frame, the directing means including at least one hydraulic master cylinder. A plurality of hydraulic slave cylinders are connected to the master cylinder and to the bell cranks for pivoting the bell cranks with respect to the frame in response to any angular displacement of the directing means with respect to the frame, thereby causing the suspension units to pivot such that their axles are directed toward the common center of the radius of the turn. Preferably, the directing means includes a pair of hydraulic master cylinders, the pistons of the cylinders being connected to a rocker arm which is in turn pivoted for rotation about a vertical axis. Hydraulic lines are provided which connect each of the master cylinders to one or more of the hydraulic slave cylinders such that angular displacement of the rocker arm causes displacement of the bell cranks connected to the slave cylinders. Preferably, the plurality of hydraulic slave cylinders are divided into a right set and a left set of slave cylinders, the right set of slave cylinders being connected to a first of the master cylinders, and the left set of slave cylinders being connected to a second of the master cylinders, the pistons of the right slave cylinders being connected to one side of their associated bell cranks, and the pistons of the left side of slave cylinders being connected to the opposite side of their associated bell cranks. Preferably, the displacement of the directing means causes a uniform displacement of all pistons in the hydraulic slave cylinders, and consequently, a uniform angular displacement of all bell cranks with respect to the frame. The bell cranks are in turn connected to their associated suspension units by tie rods of preselected length such that the angular displacement of the associated suspension units with respect to the frame is non-uniform along the length of the frame.

One feature of the present invention is that the tie rods required between the bell cranks and their associated suspension units can be made of standard unit lengths and of lighter materials than that in the prior art. The hydraulic displacement feature of the bell cranks has the advantage of permitting a substantial reduction in weight of many connecting rods between bell cranks, thereby lowering the overall mass of the trailer and the cost of production of such a trailer. The reliability of the hydraulic steering mechanism according to the present invention is believed to be superior to that of the mechanical linkage art.

Other features and advantages of the present invention will become apparent to those skilled in the art upon consideration of the following description of preferred embodiments, together with the accompanying drawings illustrating the invention and showing preferred embodiments exemplifying the best mode of carrying out the invention as presently perceived. In such drawings:

FIG. 2 is a plan schematic view of the embodiment shown in FIG. 1;

FIG. 4 is a further schematic plan view of the invention shown in the previous figures illustrating additional details of the invention.

Figure 1:
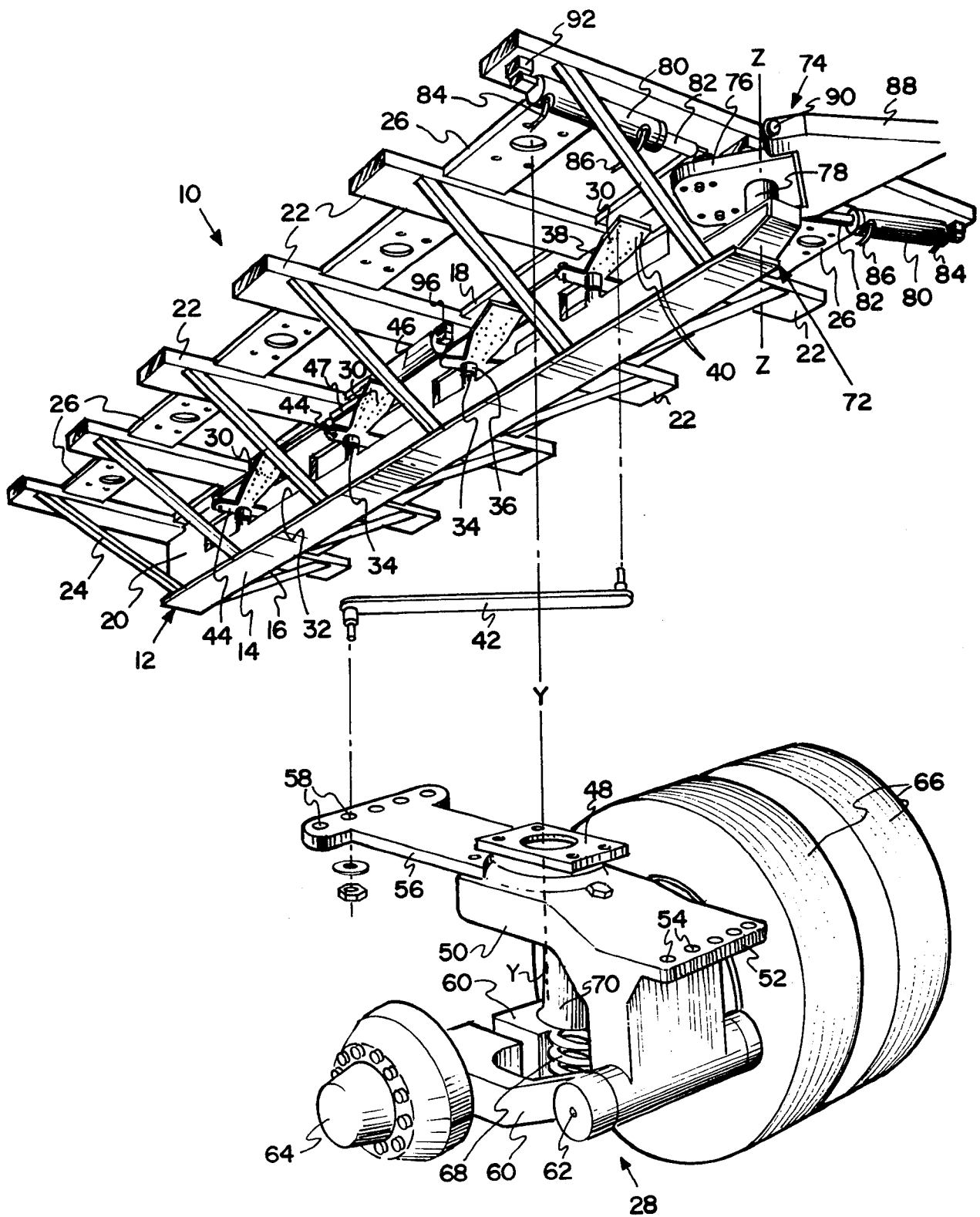
FIG. 1 is an exploded perspective view of a trailer of the present invention.

A trailer 10 of the present invention comprises a frame 12 including a central beam 14 for longitudinally supporting the load carried by the trailer. The central beam includes a lower flange 16 and an upper flange 18 which are connected together by web 20. A plurality of traverse beams 22 are fixed to the upper flange 18 of central beam 14 and extend horzontally outward from the central beam 14 to form the load-carrying platform of the trailer 10. Spurs 24 are fixed between lower flange 16 and the outer extremities of traverse beams 22 to support and reinforce the traverse beams.

Two suspension girders 26 are positioned between each adjacent pair of traverse beams 22, one such suspension girder on each side of the central beam 14.

These suspension girders 26 are adapted for receiving wheeled suspension units 28.

A plurality of bell cranks 30 are provided in apertures 32 in web 20 of central beam 14. The bell cranks 30 are pivotally mounted with respect to central beam 14 by appropriate pivots 34 fixed to a base portion 36 of bell cranks 30. In addition to the base portion 36, the bell cranks 30 each comprise a longitudinally elongated tongue portion 38, the tongue having a plurality of holes 40 for receiving tie rods 42 for connecting the bell crank 30 to associated suspension units 28. The bell cranks 30 also include a pair of wings 44 extending laterally on each side of the base portion 36 for connecting the bell crank 30 to hydraulic slave cylinders 46.

The suspension units 28 which support trailer 10 are pivotally connected to the frame 12 by fixing pivot support 48 to suspension girder 26. The pivot support 48 defines a substantially vertical axis about which each suspension unit 28 is permitted to be displaced so as to permit the trailer 10 to turn corners and the like. A suspension arm 50 rotates with respect to pivot support 48 about the substantially vertical axis Y—Y. The suspension arm 50 includes a forwardly extending tongue 52 having a plurality of apertures 54 therein. A rearwardly extending tongue 56 also includes a plurality of apertures 58, the function of apertures 54 and 58 being to receive a tie rod, such as tie rod 42 for connecting the suspension unit 28 to an associated bell crank 30. The suspension units 28 each further comprise a fork 60 hinged by hinge 62 to arm 50. An axle 64 is supported by the trailing end of forks 60, the axles 64 carrying two pairs of wheels 66 in tandem. A hydraulic cylinder 70 with a protective boot 68 downwardly biases forks 60 with respect to arm 50.

At a forward end 72 of frame 12, there is provided a directing means 74 comprising a rocker arm 76 pivoted on pivot 78 for rotation about a vertically axis Z—Z. A pair of hydraulic master cylinders 80 are provided with pistons 82 of the cylinders 80 being connected to the rocker arm 76 on opposite sides of the rocker arm pivot 78. Hydraulic lines 84 connect each of the master cylinders 80 to one or more of the hydraulic slave cylinders 46, while an additional hydraulic line 86 connects the two master cylinders 80 together. In the full trailer embodiment shown in FIGS. 1 and 2, a boom 88 is pivotally connected to rocker arm 76 by pivot 90 defining a horizontal axis X—X, whereby vertical movement of boom 88 with respect to rocker arm 76 is permitted. This feature is not present in the semi-trailer embodiment shown in FIG. 3.

The hydraulic slave cylinders 46 which are connected to master cylinders 80 by hydraulic lines 84 are fixed to frame 12 by cylinder bracket 92. The piston 47 of slave cylinder 46 is then connected to wing portion 44 of bell crank 30.

The suspension units 28 are arranged as a plurality of laterally associated pairs of suspension units, two abreast. Each laterally associated pair of suspension units 28 are connected to a common bell crank 40 by tie rods 42, the bell crank being positioned on frame 12 between the associated pair of suspension units 28. It is important to realize that a central pair 94 of suspension units 28 are not connected to any bell crank, but rather are fixed to frame 12 by an appropriate means such as tie rod 95. Thus, in a trailer according to the present invention, there can be one more associated pair of suspension units than there are bell cranks.

As is seen most dramatically in FIGS. 2 and 4, the hydraulic slave cylinders 42 are divided into a right set 96 and a left set 98 of slave cylinders 42. The right set 96 is connected to one master cylinder 80, while the left set 98 is connected to another master cylinder 80 by means of lines 84. The pistons 47 of the right slave cylinders 96 are connected to one side of the associated bell cranks 30, while the pistons 47 of the left set 98 of slave cylinders 46 are connected to the opposite side of their associated bell cranks 30.

Figure 3:
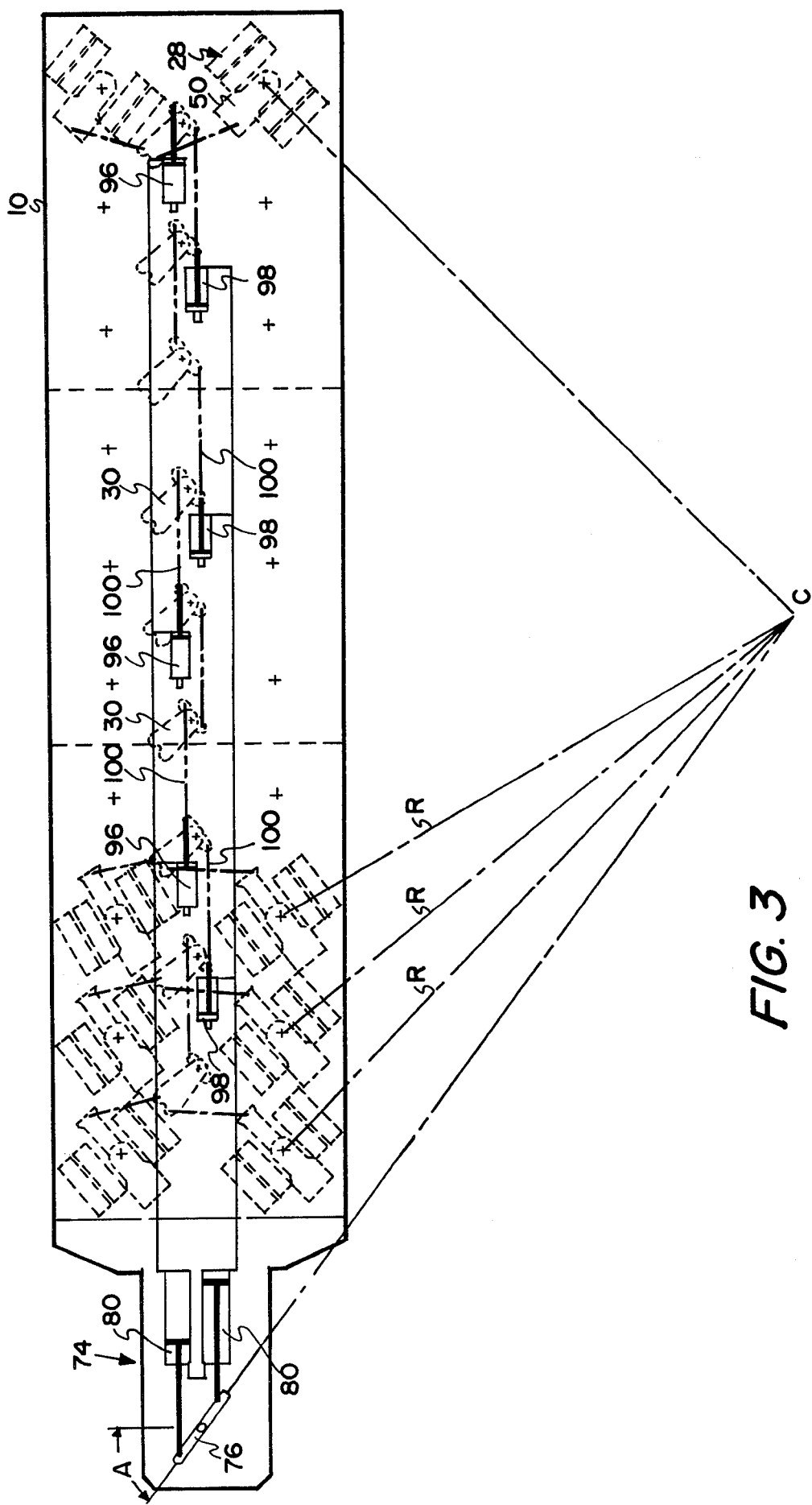
FIG. 3 is a plan schematic view of an alternative embodiment of the invention.

As shown in both FIGS. 2 and 3, it is not necessary to supply a slave cylinder 46 for each bell crank 30, although such is in fact possible. Rather, it is believed to be more convenient to include longitudinal tie rods 100 between adjacent pairs of bell cranks 30. As will be noted in FIGS. 2-4, the displacement of the directing means 74 by an appropriate unit not illustrated causes a uniform angular displacement of all of the hydraulic slave cylinders 42, and thus a uniform angular displacement of all of the bell cranks 30 with respect to frame 12. It is further to be noted from FIG. 4 that the associated pairs of suspension units 28 which are close to the central associated pair 94 are connected to their associated bell crank 30 by tie rods 42 which connect with apertures 40 very close to base 36 of bell crank 30. On the other hand, the associated pairs of suspension units 28 on the ends of the trailer 10 are connected to their associated bell cranks 30 by tie rods 42 which connect to apertures 40 near the outer end of tongue portion 38 of bell crank 30. Furthermore, the associated pairs of suspension units 28 which are forward of the central associated pair 94 are connected to their respective bell crank 30 by tie rods 42 which engage the rear tongue 56 of suspension arm 50. On the other hand, the pairs of suspension units 28 which are rearward of the central associated pair 94 are connected to their respective bell cranks 30 by tie rods 42 connected to forward tongue 52 of suspension arm 50.

As will be noted from consideration of FIG. 3, the angular displacement of rocker arm 76 through an angle A causes the various associated pairs of suspension units to be displaced through various angles such that the axles 76 of the various suspension units are aligned with radius lines R drawn from a common center C which is the center of curvature of the turn through which the trailer is actually being directed to turn. While the present invention has been described with reference to illustrated preferred embodiments, other variations and modifications of the present invention may be possible which are within the spirit and scope of the appended claims.

What is claimed is:

1. A trailer, comprising:
a frame,
a plurality of bell cranks, each being symmetrical about its transverse axis, and being pivotally supported on the frame,
a plurality of suspension units pivotally connected to the frame about substantially vertical axes to permit directional displacement of each suspension unit with respect to the frame, each suspension unit having a single axle, and each unit including a suspension arm having a forwardly extending tongue and a rearwardly extending tongue and wherein the plurality of suspension units are arranged as a plurality of laterally associated pairs of suspension units, two abreast, a laterally associated pair of suspension units being connected to a common bell crank positioned on the frame between the associated pair of suspension units, coupling means for interconnecting one of said symmetrical portions of a bell crank with one of said extending tongues of said suspension arm directing means connected to an end of the frame for directing the trailer in the intended direction, the directing means being angularly displaceable with respect to the frame, the directing means including at least one hydraulic master cylinder, a plurality of hydraulic slave cylinders connected to the master cylinders and to the bell cranks for pivoting the bell cranks with respect to the frame in response to any angular displacement of the directing means with respect to the frame, thereby causing the suspension units to pivot such that their axles are directed toward a common center.

2. The trailer of claim 1 wherein the directing means comprises a rocker arm pivoted for rotation about a vertical axis, a pair of hydraulic master cylinders, the pistons of the cylinders being connected to the rocker arm on opposite sides of the rocker arm pivot, hydraulic lines connecting each of the master cylinders to one or more of the hydraulic slave cylinders and an additional hydraulic line connecting the two master cylinders together.

3. The trailer of claim 2, further comprising a boom pivotally connected to the rocker arm about a horizontal axis for vertical movement with respect thereto and horizontal movement therewith, the horizontal angular displacement of the boom causing actuation of the master cylinders and in turn pivoting of the suspension units.

4. The trailer of claim 2 wherein the plurality of hydraulic slave cylinders are divided into a right set and a left set of slave cylinders, the right set of slave cylinders being connected to a first of the master cylinders and the left set of slave cylinders being connected to a second of the master cylinders, the pistons of the right slave cylinders being connected to one side of their associated bell cranks and the pistons of the left set of slave cylinders being connected to the opposite side of their associated bell cranks.

* * * * *